United States Patent [19]

Ikarashi et al.

[11] Patent Number: 5,027,036
[45] Date of Patent: Jun. 25, 1991

[54] DRIVE CIRCUIT FOR AN ELECTROLUMINESCENCE DISPLAY DEVICE

[75] Inventors: Masami Ikarashi; Kenichi Mitsumori, both of Furukawa, Japan

[73] Assignee: Alps Electric Co., Ltd., Tokyo, Japan

[21] Appl. No.: 396,505

[22] Filed: Aug. 21, 1989

[30] Foreign Application Priority Data

Nov. 25, 1988 [JP] Japan ................ 63-297406

[51] Int. Cl.$^5$ .................. G09G 3/10; G09G 3/30
[52] U.S. Cl. .................. 315/169.3; 315/307; 340/781
[58] Field of Search ............ 315/169.3, 219, 307; 340/781, 811, 766, 767, 768, 782, 783

[56] References Cited

U.S. PATENT DOCUMENTS

| | | | |
|---|---|---|---|
| 2,937,298 | 5/1960 | Putkovich et al. | 315/169.3 |
| 3,343,128 | 9/1967 | Rogers | 315/169.3 |
| 3,629,653 | 12/1971 | Munt | 315/169.3 |
| 4,254,362 | 3/1981 | Tulleners | 315/219 |
| 4,319,164 | 3/1982 | Tulleners | 315/219 |
| 4,449,075 | 5/1984 | D'Onofrio et al. | 315/169.3 |
| 4,527,096 | 7/1985 | Kindlmann | 315/169.3 |
| 4,595,861 | 6/1986 | Simopoulos et al. | 315/169.3 |
| 4,611,150 | 9/1986 | Ball et al. | 315/307 |
| 4,633,141 | 12/1986 | Weber | 315/307 |
| 4,845,489 | 6/1989 | Hormei | 340/811 |

FOREIGN PATENT DOCUMENTS

38-202888 8/1963 Japan.

*Primary Examiner*—Eugene R. LaRoche
*Assistant Examiner*—Ali Neyzari
*Attorney, Agent, or Firm*—Guy W. Shoup

[57] ABSTRACT

There is provided a drive circuit for an electro-luminescence (EL) display device comprising a variable frequency oscillator circuit whose output signal frequency is externally modifiable, a voltage booster circuit for boosting the output signal of said variable frequency oscillator circuit to a predetermined level and supplying it to an EL display device as drive voltage, an impedance matching circuit whose impedance is externally modifiable and which is connected to said display device, a timing means for timing the duration of application of drive voltage to said display device and a control means for switching the output signal frequency of said variable frequency oscillator circuit and the impedance of said impedance matching circuit in accordance with said duration of voltage application. It is apparent that a drive circuit having such an arrangement as described above can effectively correct any shift of color of the light emitted from the connected EL display device and maintain the original color of the EL display device. Moreover, such a drive circuit for an EL display device can effectively compensate the loss of brightness of the screen of the EL display device connected therewith and hence prolong the apparent life of the display device.

2 Claims, 5 Drawing Sheets

DRIVE CIRCUIT FOR AN ELECTROLUMINESCENCE DISPLAY DEVICE

BACKGROUND OF THE INVENTION

1. Field of the Invention

This invention relates to a drive circuit to be suitable used for driving an electroluminescence (EL) display device.

2. Prior Art

A circuit diagram of a conventional drive circuit for an EL display device is illustrated in FIG. 5 of the accompanying drawings. Such a drive circuit typically comprises a power supply section 1, an oscillator section 2 and a voltage booster section 3. Stabilization of the DC power source E in the power supply section 1 is achieved by a condenser $C_1$. The oscillator section 2 comprises a transistor $Q_1$, condensers $C_2$ and $C_3$, resistors $R_1$ and $R_2$. The voltage booster section 3 is constituted by a transformer T. In a drive circuit having a configuration as described above, the oscillation output of the oscillator section 2 is boosted to a predetermined level (approximately 100 V) by the transformer T and fed as drive voltage to an EL display device 4. The oscillator section 2 is influenced by resonance frequency $f_0$ which is defined in terms of capacitance C of the EL display device 4 and reactance L of the transformer T or $$f_0 = 1/2\pi \sqrt{LC} \quad (1)$$

and forcedly oscillates with the resonance frequency $f_0$. Therefore, the values of resistance of the resistors and those of capacitance of the condensers involved are so determined that the oscillation frequency of the oscillator section 2 agrees with the resonance frequency $f_0$. In other words, the EL display device 4 is driven by this drive circuit by using only one frequency.

Generally, blue-green light emitting fluorescent powdery materials used for dispersion EL display devices have properties as described below.

(1) As the drive frequency becomes high, the color of the emitted light shifts from green to blue.

(2) As the involved material is degraded with time through use, the color of the emitted light shifts from blue to green if the drive frequency is kept unchanged.

Now, if an EL display device 4 is driven by a drive circuit as illustrated in FIG. 5, the display device will be degraded with time and the capacitance C of the display device 4 will be varied in response to the degradation to consequently shift the drive frequency to a higher level. Accordingly, the color of the emitted light of the EL display device 4 will shift with time in a manner as described in (1) and (2) above or from blue to green. FIG. 6 is a graphic illustration of the shift of the color of the emitted light with time expressed by using chromaticity coordinates (x, y) defined by the CIE.

There has been known a drive circuit comprising a transformer having a vertically adjustable core of a coil for regulating the color of the emitted light of an EL display device. Such a drive circuit can be used for an EL display device by adjusting the vertical position of the core of the coil to match the correct color of the display device.

PROBLEMS TO BE SOLVED BY THE INVENTION

A drive circuit for an EL display device as described above normally can modify its drive frequency by approximately 20 percent, which is defined by the range of variability (approximately 30 percent) of the reactance L of the transformer T. On the other hand as is obvious from FIG. 7, the drive frequency has to have a range of variability twice as large as the one mentioned above and preferably more than 100 percent to effectively correct the greeny color of the emitted light due to degradation of the display device with time to the original blue color (the coordinates for FIG. 7 being CIE's chromaticity coordinates same as those in FIG. 6). Therefore, the variable range of frequency of a conventional drive circuit as described above is far from satisfactory in terms of correction of the shifted color of a degraded EL display device. Moreover, such a conventional drive circuit requires a cumbersome operation of modifying its reactance each time when a different EL display device is connected to it.

Therefore an object of the present invention is to provide a drive circuit that can satisfactorily correct any color shift of an EL display device.

SUMMARY OF THE INVENTION

According to the invention, there is provided a drive circuit for an EL device comprising a variable frequency oscillator circuit whose output signal frequency is externally modifiable, a voltage booster circuit for boosting the output signal of said variable frequency oscillator circuit to a predetermined level and supplying it to an EL display device as drive voltage, an impedance matching circuit whose impedance is externally modifiable and which is connected to said display device, a timing means for timing the duration of application of drive voltage to said display device and a control means for switching the output signal frequency of said variable frequency oscillator circuit and the impedance of said impedance matching circuit in accordance with said duration of voltage application.

Preferably a drive circuit according to the invention may comprise a variable frequency oscillator circuit whose output signal frequency is externally modifiable, a voltage booster circuit for boosting the output signal of said variable frequency oscillator circuit to a predetermined level and supplying it to an EL display device as voltage, an impedance matching circuit whose impedance is externally modifiable and which is connected to said display device, an emitted light color detector for detecting the color of the light emitted from said display device and a control means for switching the output signal frequency of said variable frequency oscillator circuit and the impedance of said impedance matching circuit in accordance with said color of the emitted light.

EFFECTS

A drive circuit having a configuration as described in the first half of the above summary measures the duration of time used for an EL display device and performs adjustment of the drive frequency for the EL display device as well as of the impedance of the impedance matching circuit connected with the EL display device to correct any shift of color of the light emitted from the EL display device.

On the other hand, a drive circuit with a configuration as described in the second half of the summary detects the color of the light emitted from an EL display device with which it is connected by means of the emitted light color detecting means it comprises and performs adjustment of the drive frequency for the EL display device and of the impedance of the impedance matching circuit connected to the display device.

Now the invention will be described in greater detail by referring to the accompanying drawings that illustrate preferred embodiments of the invention.

BRIEF DESCRIPTION OF THE DRAWINGS

Of the accompanying drawings:

FIGS. 3 and 4 are graphic illustrations showing secondary effects of the invention, of which FIG. 3 is a graph showing the relationship between the operational duration and the relative brightness of an EL display device and FIG. 4 is a graph for the relationship between the drive frequency and the brightness of the emitted light;

DETAILED DESCRIPTION OF THE INVENTION

Figure 1:
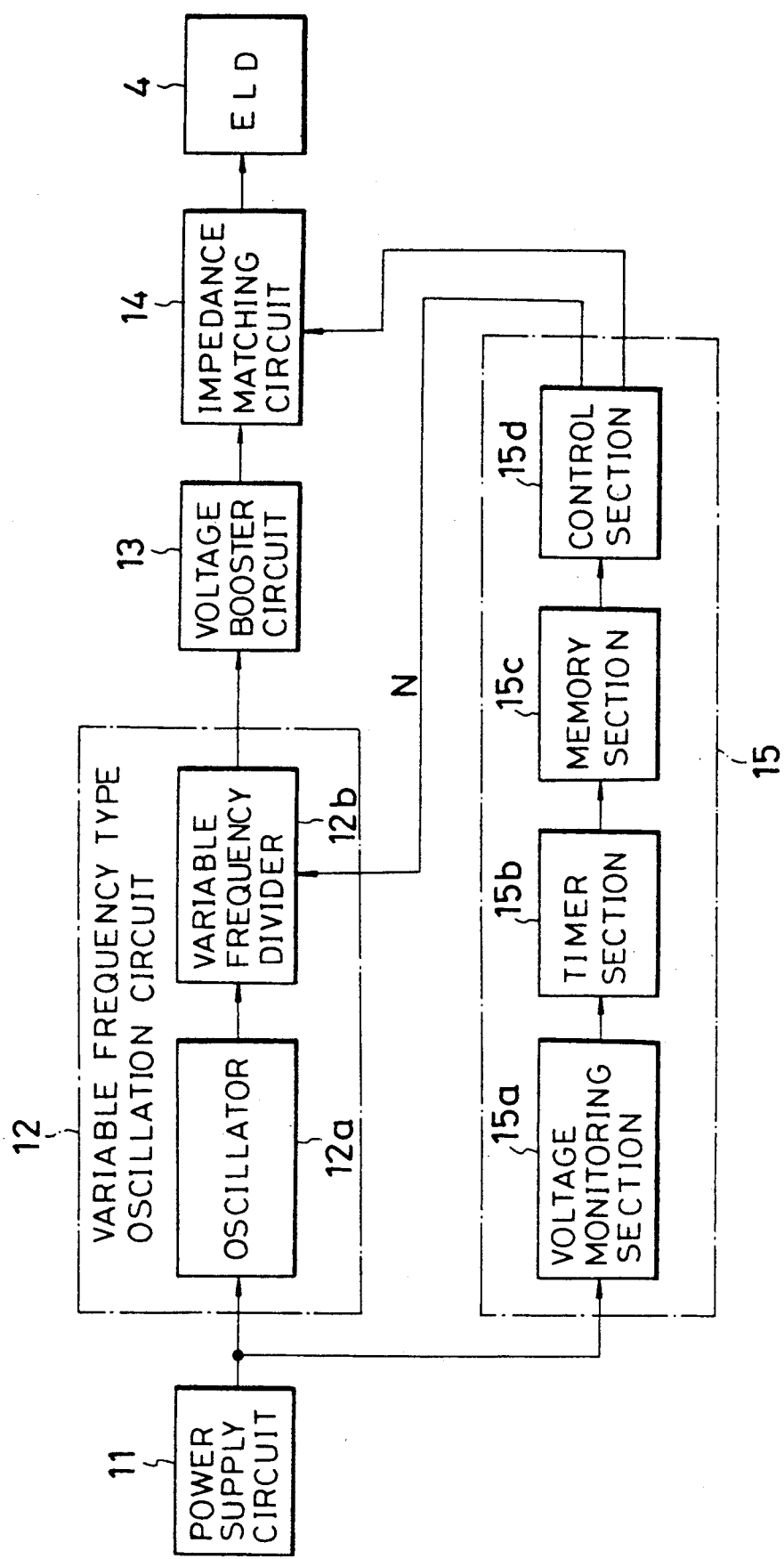
FIG. 1 is a block diagram of an embodiment of the drive circuit for an EL display device according to the invention.

Now referring to FIG. 1 showing a block diagram of an embodiment of the drive circuit for an EL display device according to the invention, reference numeral 11 denotes a power supply circuit. When the power switch for the circuit not shown in the diagram is turned on, DC power is supplied from the power supply circuit 11 at a constant rate. Reference numeral 12 denotes a variable frequency oscillator circuit comprising an oscillator 12a for transmission of a wave of a given frequency and a variable frequency divider 12b for dividing the frequency of the output of said oscillator 12a. Reference numeral 13 denotes a voltage booster circuit for boosting the output signal of said variable frequency divider 12b to a predetermined level (normally approximately 100 V) and conveying it further away. Reference numeral 14 denotes an impedance matching circuit comprising a coil and condensers which are arranged in such a manner that its circuit constants can be modified from outside so that the portion of the circuit from the voltage booster circuit 13 to an EL display device 4 connected to the drive circuit resonates with the drive frequency of the EL display device 4. Reference numeral 15 denotes a control circuit comprising a voltage monitor section 15a for monitoring the voltage of the power coming from the power supply circuit 11, a timer section 15b for measuring the duration of power supply of a given voltage from the power supply circuit 11, a memory section 15c constituted by a non-volatile memory for storing timing data from the timer section 15b and a control section 15 for modifying the frequency dividing ratio of the variable frequency divider 12b in accordance with the timing data of the memory section 15c and adjusting the impedance of the impedance matching circuit 14.

A drive circuit having a configuration as described above operates in the following manner. When the power switch not shown is turned on, DC current is supplied at a predetermined constant level from the power supply circuit 11 to the related sections of the circuit. Then the rising edge of the power supplied from the power supply circuit 11 is detected by the voltage monitor section 15a and detection of a rising edge by the voltage monitor section 15a automatically resets the timer section 15b, which then starts its timing operation.

On the other hand, the control section keeps on modifying the drive frequency of the EL display device on the basis of the timing data stored in the memory section 15c for the current operation. More specifically, since the drive frequency for an EL display device 4 requires incessant modification or enhancement in order to maintain the original color of the light emitted from the display device 4 in response to the elapsed time of operation, data on the relationship between the duration of operation and the drive frequency required to maintain the original color of the emitted light is stored in advance in the control section 15d, which determines the required level of drive frequency on the basis of this relationship and the timing data stored in the memory section 15c. The variable frequency divider 12b so modifies the ratio of frequency division N that the required drive frequency is obtained at any time during operation. On the other hand, the impedance of the impedance matching circuit 14 is so adjusted that the portion of the circuit from the voltage booster circuit 13 to the EL display device 4 resonates with the determined drive frequency. The timer section 15b is reset each time after elapse of a predetermined duration of time and then a signal is sent to the memory section 15c to write new timing data into the memory. The control section 15d performs a new modifying operation similar to the one described above in response to the newly written timing data in the memory section 15c. Consequently, the drive frequency for the EL display device 4 is constantly modified to an optimum level in response to the duration of the display operation to maintain the original color of the light that the display device 4 emits.

When the power switch is turned off, the falling edge of the power supplied from the power supply circuit 11 is detected by the voltage monitor section 15a, while a signal is transmitted from the timer section 15b and written into the memory section 15c. Then the current reading of the timer section 15b is added to the timing data of the memory section 15c to provide a new timing data to be stored in the memory section 15c. The control circuit 15 further provides back-up power to ensure that the above writing operation is successfully completed after the fall of the voltage of the power from the power supply circuit 11.

Figure 2:
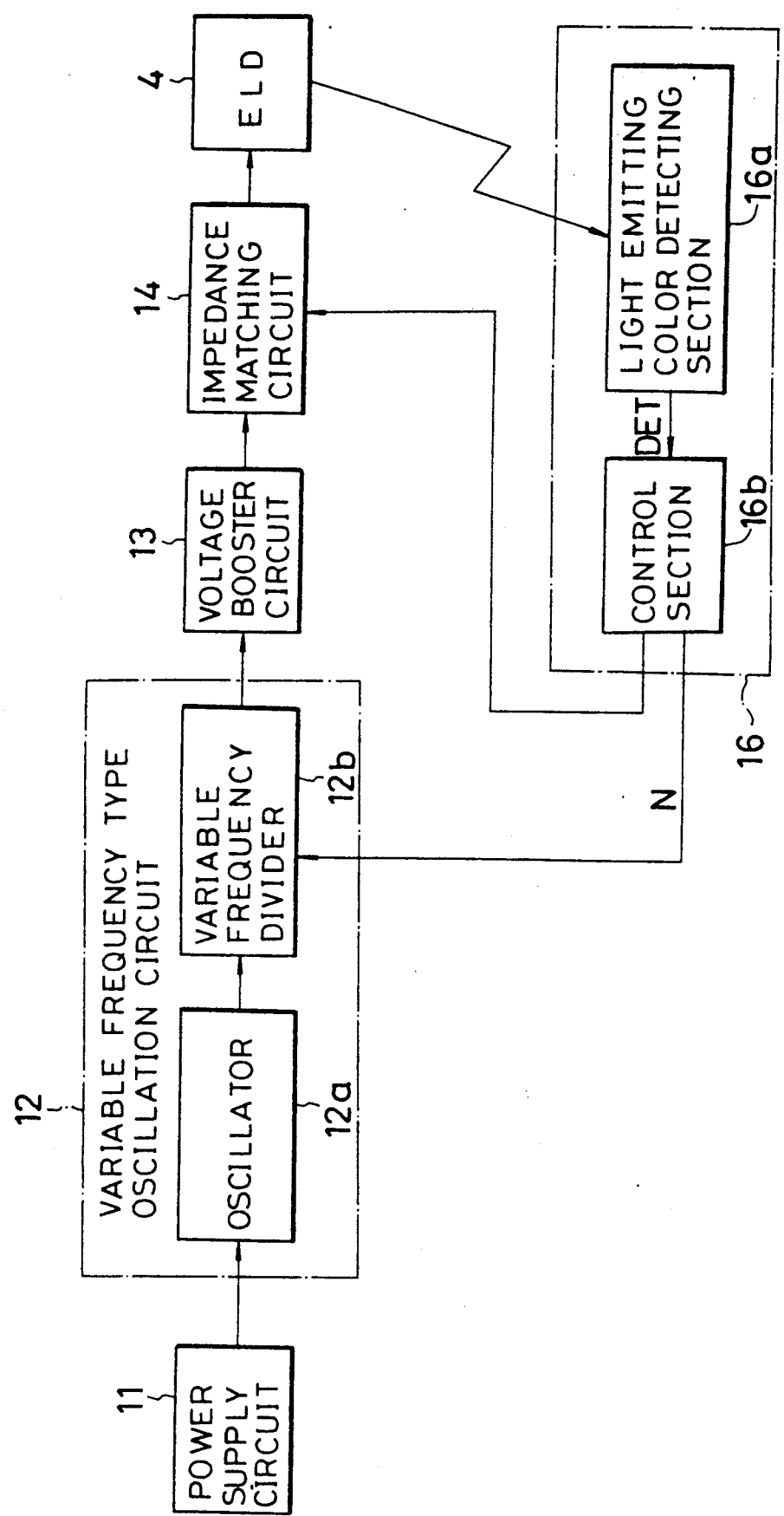
FIG. 2 is a block diagram of another embodiment of the drive circuit for an EL display device according to the invention.

Now referring to FIG. 2 illustrating a block diagram of another embodiment of the drive circuit for an EL display device according to the invention, the sections of the embodiment that correspond to those of the first embodiment are identifiably by identical reference numerals and hence descriptions of those sections are omitted here.

In FIG. 2, reference numeral 16 denotes a control circuit comprising an emitted light color detector section 16a for detecting the color of the light emitted by the connected EL display device and a control section 16b for modifying the ratio of frequency division N in response to the result of the above described detecting operation and at the same time adjusting the impedance of the impedance matching circuit 14. The emitted light color detector section 16a may be realized in the form of a charge coupled device (CCD) camera or in the form of a combination of a filter that transmits a specific color and a light sensor.

With a drive circuit having a configuration as described above, the color of the light emitted by the connected EL display device is constantly monitored by the emitted light color detector section 16a, which sends a detection signal DET to the control section 16b each time it detects a change of color. The control section 16b compares the DET signal and the defined color for the emitted light and so modifies the ratio of frequency division N and the impedance of the impedance matching circuit 14 that the EL display device 4 always emits light having a predefined color.

EFFECTS OF THE INVENTION

A drive circuit for an EL display device as described in the first half of the summary of this patent specification comprises a variable frequency oscillator circuit whose output signal frequency is externally modifiable, a voltage booster circuit for boosting the output signal of said variable frequency oscillator circuit to a predetermined level and supplying it to an EL display device as drive voltage, an impedance matching circuit whose impedance is externally modifiable and which is connected to said display device, a timing means for timing the duration of application of drive voltage to said display device and a control means for switching the output signal frequency of said variable frequency oscillator circuit and the impedance of said impedance matching circuit in accordance with said duration of voltage application. It is apparent that a drive circuit having such an arrangement as described above can effectively correct any shift of color of the light emitted from the connected EL display device and maintain the original color of the EL display device.

A drive circuit for an EL display device as described in the second half of the summary of this patent specification comprises additionally and in place of some of the sections of the above circuit an emitted light color detector for detecting the color of the light emitted from said display device and a control means for switching the output signal frequency of the variable frequency oscillator circuit and the impedance of the impedance matching circuit in accordance with said color of the emitted light. It is apparent that a drive circuit having such an arrangement as described above can effectively control the drive frequency for an EL display device and maintain the original color of the light emitted from the EL display device.

Figure 3:
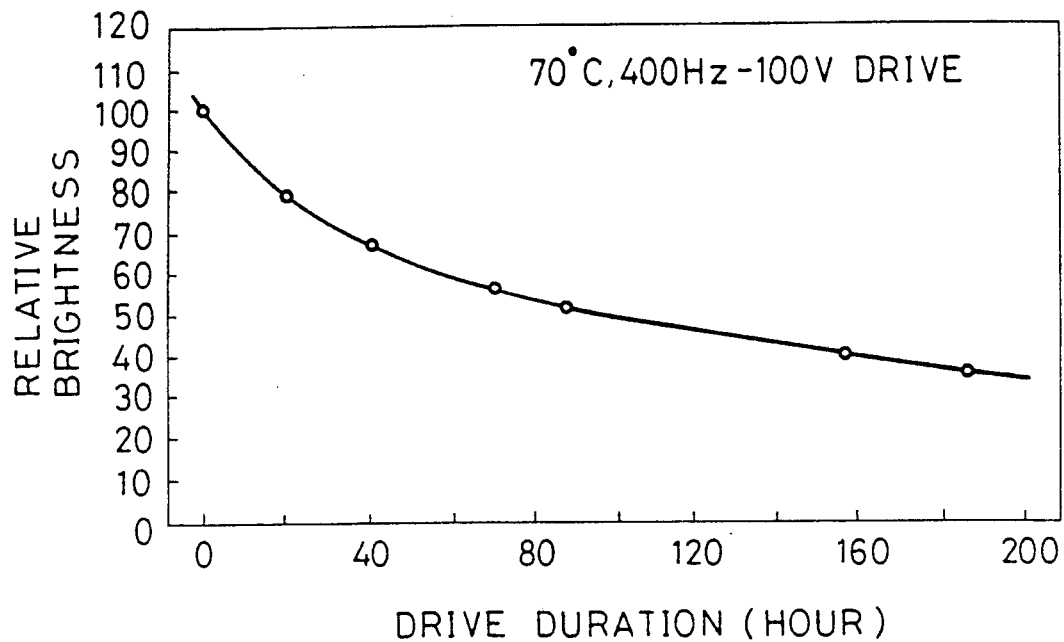
Figure 4:
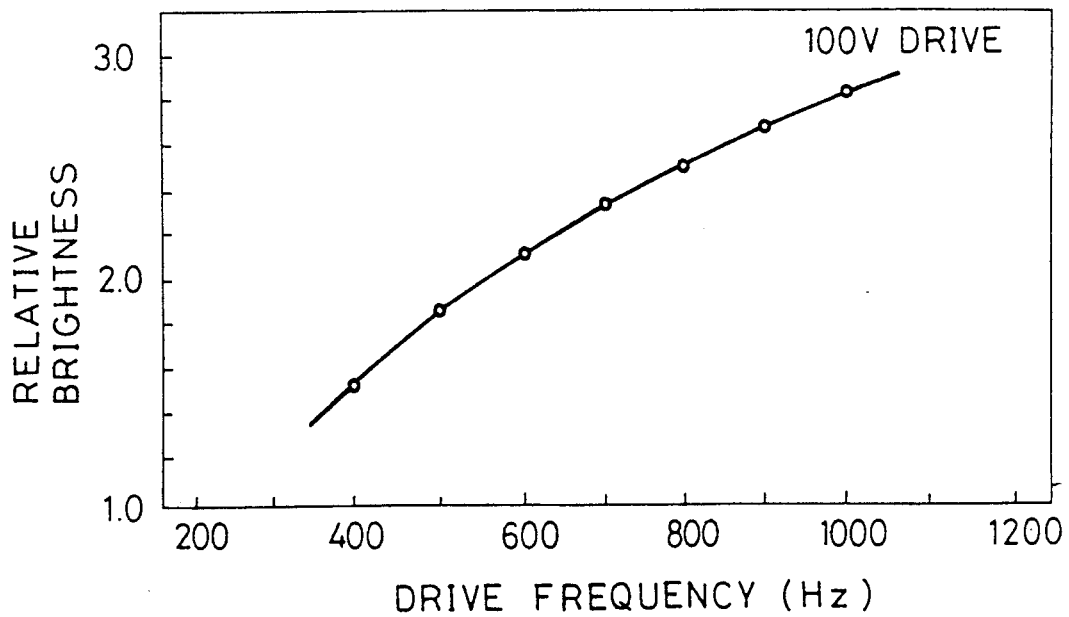
Figure 5:
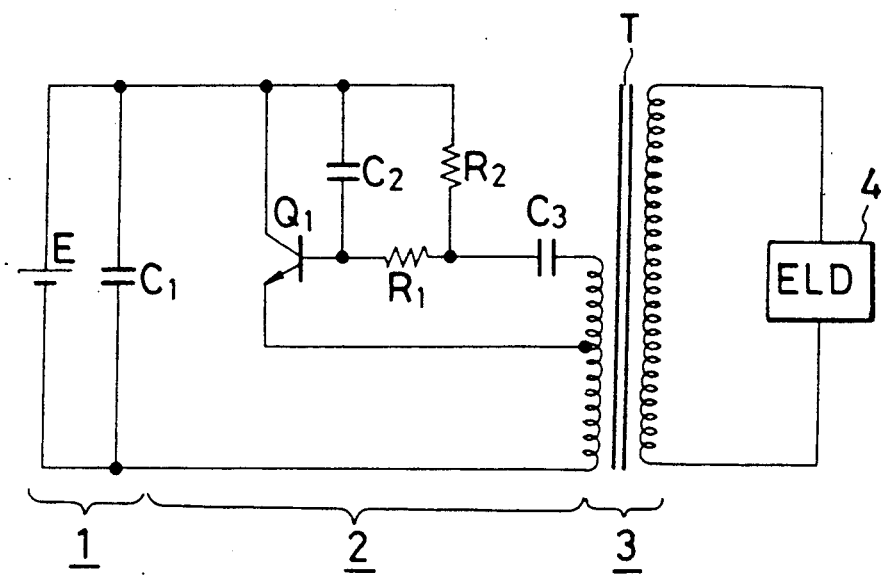
FIG. 5 is a diagram of a conventional drive circuit for an EL display device.
Figure 6:
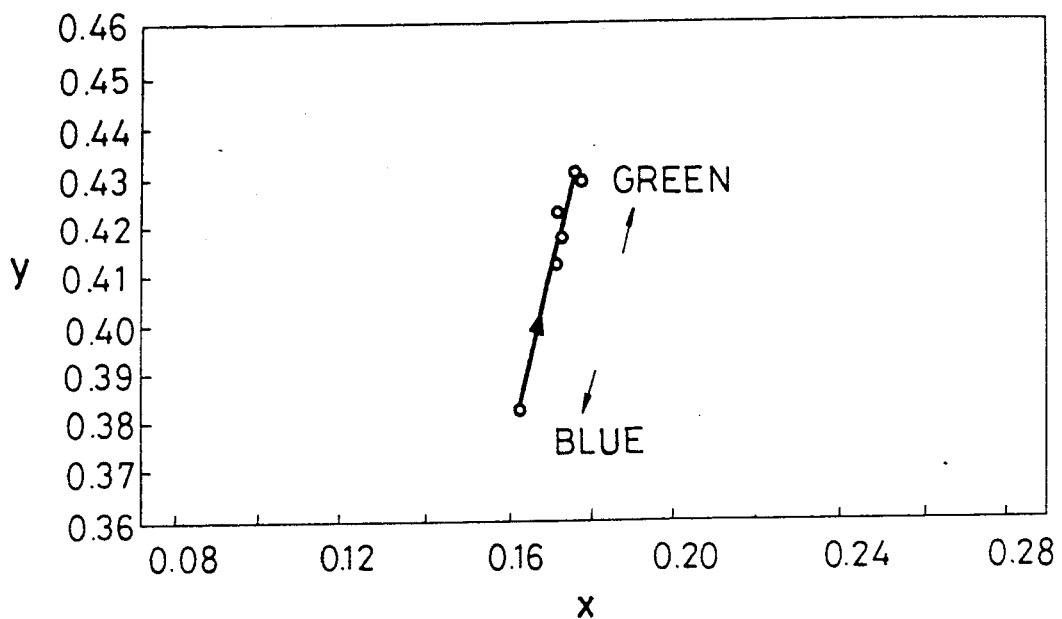
FIG. 6 is a graph illustrating shift of color of the light emitted from an EL display device relative to the operational duration of the device.
Figure 7:
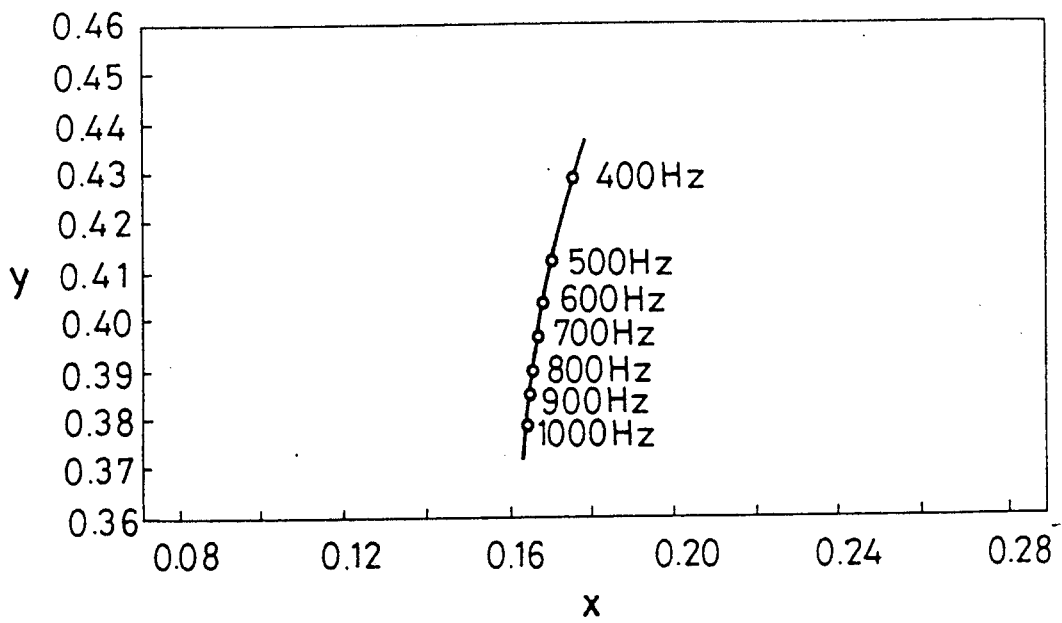
FIG. 7 is a graph illustrating the relationship between the drive frequency and the color of the emitted light of an EL display device.

Moreover, a drive circuit for an EL display device according to the invention additionally has certain secondary effects as described below. As illustrated by the graph of FIG. 3, an EL display device gradually looses the brightness of the light it emits with time during which it is operated. On the other hand, the brightness of the light that an EL display device emits can be boosted by enhancing its drive frequency as illustrated in FIG. 4. Therefore, the loss of brightness with time of the light emitted from an EL display device can be compensated if it is used with a drive circuit according to the invention because the drive frequency is gradually enhanced in response to the time it is operated. Consequently, there will be little or no loss of brightness with time of the light emitted from an EL display device used in combination with a drive circuit according to the invention and hence the apparent life of the EL display device is prolonged.

What is claimed is:

1. A drive circuit for an electroluminescence display device comprising a power supply for supplying DC power at a constant rate, a variable frequency oscillator circuit whose output signal frequency is externally modifiable so that the required drive frequency is obtained at any time during operation, a voltage booster circuit for boosting the output signal of said variable frequency oscillator circuit to a predetermined level and supplying it to said display device as drive voltage, an impedance matching circuit whose impedance is externally modifiable so that the portion of the circuit from the voltage booster circuit to said electroluminescence display device resonates with the determined drive frequency, a timing means for timing the duration of application of drive voltage to said display device and a control means for switching the output signal frequency of said variable frequency oscillator circuit and the impedance of said impedance matching circuit in accordance with said duration of voltage application.

2. A drive circuit for an electroluminescence display device comprising a power supply for supplying DC power at a constant rate, a variable frequency oscillator circuit whose output signal frequency is externally modifiable so that the required drive frequency is obtained at any time during operation, a voltage booster circuit for boosting the output signal of said variable frequency oscillator circuit to a predetermined level and supplying it to said display device as drive voltage, an impedance matching circuit whose impedance is externally modifiable so that the portion of the circuit from the voltage booster circuit to said electroluminescence display device resonates with the determined drive frequency, an emitted light color detector for detecting the color of the light emitted from said display device and a control means for switching the output signal frequency of said variable frequency oscillator circuit and the impedance of said impedance matching circuit in accordance with said color of the emitted light.

* * * * *